Inventor:
KARL SPIESS

United States Patent Office 3,473,759
Patented Oct. 21, 1969

3,473,759
VIBRATORY CONVEYOR
Karl Spiess, Herzogenaurach, Germany, assignor to Industriewerk Schaeffler OHG, Herzogenaurach, Germany, a corporation of Germany
Filed Dec. 4, 1967, Ser. No. 687,842
Claims priority, application Germany, Jan. 18, 1967, J 32,801
Int. Cl. B65g 27/24
U.S. Cl. 198—220
2 Claims

ABSTRACT OF THE DISCLOSURE

A novel vibratory conveying apparatus comprised of a stationary base plate, a bowl provided with a helical track and connected to the base plate by elastic guide springs and driving means consisting of a plurality of periodically activated electromagnets and armatures therefor separated from the electromagnets by air gaps, the said electromagnets and armatures being arranged so that the vectors of magnetic forces of attraction act in the same circumferential direction on the bowl.

PRIOR ART

Vibratory conveying apparatus with a helical conveyor track for the transportation of solid materials are known. The helical track is subjected to rotational and torsional vibrations through elastic guide springs inclined towards the gradient of the helical track and an electromagnetic driving means. The vibrations induce the parts placed in the bowl to travel upwardly in sequence on the helical conveyor track. Vibratory conveying apparatus in which the conveyor track is provided with means for sorting and aligning production parts is particularly suited for the automatic loading of process and packing machinery.

A preferred known vibratory conveying apparatus has an electromagnetic drive means and a cylindrical bowl with a helical conveyor track. The periodically actuated electromagnets are arranged on the stationary base plate and the armatures spaced therefrom are secured to the cylindrical bowl. The vectors of the magnetic attraction forces act similarly in a circumferential direction on the bowl and thus induce an oscillating torsional vibration by the inclined elastic guide springs.

However, since the driving means of the known vibratory conveyors consisted of a plurality of electromagnets which were individually adjusted to regulate the space between the magnet and its armature, it was difficult to adjust all the electromagnets so that they had the same air gaps and required multiple adjustments of great precision to avoid a decline in feeding capacity. Also, the air gaps should be as narrow as possible to obtain the greatest magnetic attraction and the highest conveying capacity. The armatures, however, must not toss against the electromagnets to avoid interrupting the conveying effect caused by the periodic motions.

OBJECTS OF THE INVENTION

It is an object of the invention to provide a vibratory conveying apparatus which operates at maximum conveying capacity.

It is another object of the invention to provide a vibratory conveying apparatus having electromagnetic driving means which can be simply adjusted.

These and other objects and advantages of the invention will become obvious from the following detailed description.

The vibratory conveying apparatus of the invention is comprised of a stationary base plate, a bowl provided with a helical conveyor track connected to the base plate by elastic guide springs and driving means comprising a plurality of periodically activated electromagnets and cooperating armatures separated by an air gap, one part of the driving means being secured to the said bowl and the other part of the driving means being secured to a common plate which is adjustably and rotatably secured to the stationary base plate, the said driving means being arranged so that the vectors of the magnetic attraction forces act in the same circumferential direction on the bowl.

By arranging either the electromagnets or their cooperating armatures on a common plate which is then rotatably and adjustably secured to the stationary base plate, the air gaps between all the electromagnets and their armatures can be uniformly varied all at once. The simultaneous adjustment of the air gap simplifies adjustment and since each of the air gaps is of identical width, the optimum magnetic attractive force can be obtained.

Referring now to the drawings.

Figure 1:
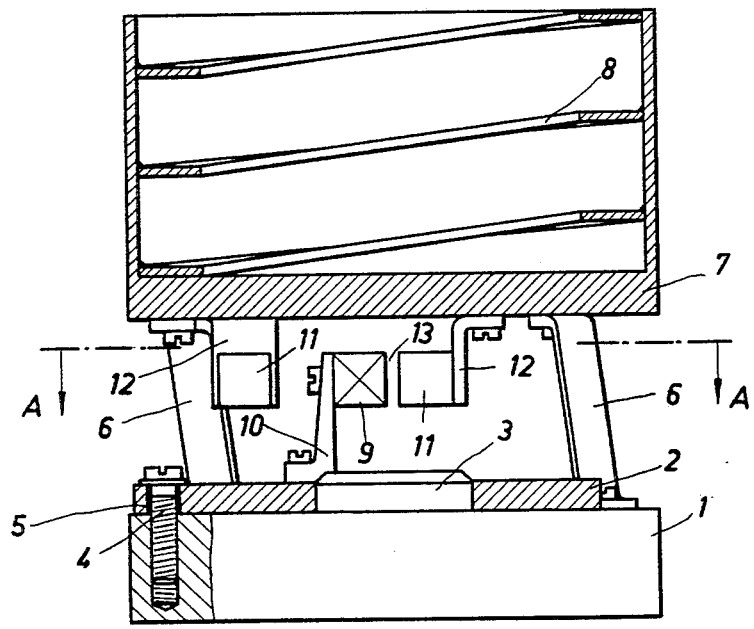
FIG. 1 is a cross-sectional view of an embodiment of a vibratory conveying apparatus of the invention taken along line B—B of FIG. 2.
Figure 2:
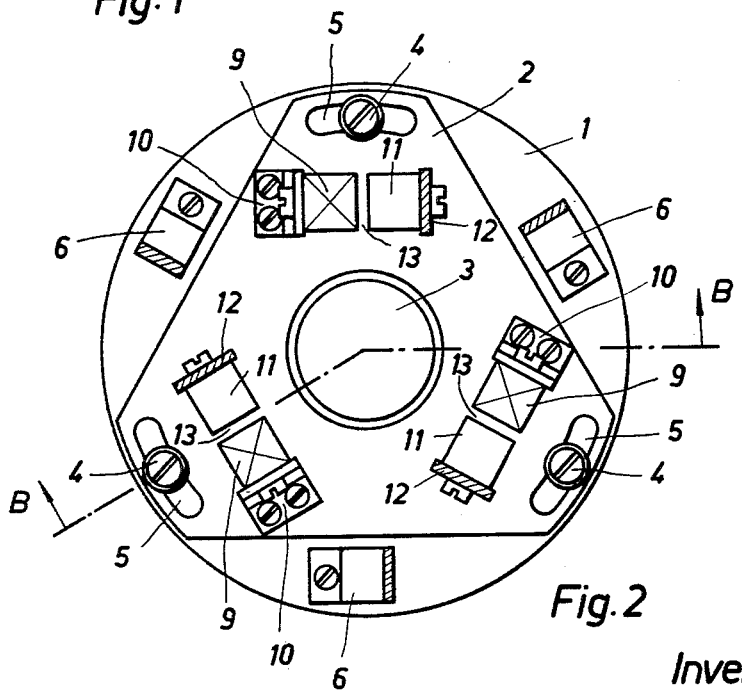
FIG. 2 is a sectional view of the same embodiment taken along line A—A of FIG. 1.

In the illustrated embodiment, a plate 2 having the shape of a triangle with rounded off corners is arranged rotatably in central guide 3 and secured with screws 4 onto stationary base plate 1. Elastic guide springs 6 connect stationary base plate 1 with cylindrical bowl 7 which supports helical track 8. The triangular plate 2 is provided with circular oblong holes 5 and electromagnets 9 are secured to the plate 2 with brackets 10. The armatures 11 are fixedly secured to the bowl 7 by brackets 12. For the simultaneous adjustment of air gaps 13, screws 4 are loosened and plate 2 is rotated until all the electromagnets 9 toss against their corresponding armatures 11. The screws 4 then are loosely tightened and plate 2 is rotated in a peripheral direction by impacts until the armatures 11 no longer toss against the electromagnets. This can be acoustically ascertained as the tossing effects a characteristic noise and as soon as this noise is no longer audible, the screws 4 are tightened completely whereby all of the air gaps 13 are adjusted to a common width. In a modification of the said embodiment, the armatures may be secured to the plate 2 and the magnets secured to the cylindrical bowl 7.

Various modifications of the apparatus of the invention may be made without departing from the spirit or scope thereof and it is to be understood that the invention is to be limited only as defined in the appended claims.

I claim:
1. A vibratory conveying apparatus comprising a stationary base plate, a common plate, a bowl provided with a helical conveyor track connected to the base plate by elastic guide springs and a driving means comprising a plurality of periodically activated electromagnets and cooperating armatures separated by an air gap, one part of the driving means being secured to the said bowl and the other part of the driving means being secured to a common plate which is adjustably and rotatably secured to the stationary base plate, the said driving means being arranged so that the vectors of the magnetic attraction forces act in the same circumferential direction on the bowl.

2. The apparatus of claim 1 wherein the electromagnets are secured to the common plate and the armatures are secured to the cylindrical bowl.

References Cited

UNITED STATES PATENTS 3,315,793  4/1967  Yakubovich _____ 198—220

EDWARD R. SROKA, Primary Examiner